US011295024B2

(12) United States Patent
Bursell et al.

(10) Patent No.: US 11,295,024 B2
(45) Date of Patent: *Apr. 5, 2022

(54) PROVIDING SMART CONTRACTS INCLUDING SECRETS ENCRYPTED WITH ORACLE-PROVIDED ENCRYPTION KEYS USING THRESHOLD CRYPTOSYSTEMS

(71) Applicant: Red Hat, Inc., Raleigh, NC (US)

(72) Inventors: Michael H. M. Bursell, Farnborough (GB); Axel Simon, Paris (FR); Nathaniel McCallum, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 248 days.

This patent is subject to a terminal disclaimer.

(21) Appl. No.: 16/252,068

(22) Filed: Jan. 18, 2019

(65) Prior Publication Data

US 2020/0233966 A1 Jul. 23, 2020

(51) Int. Cl.
*H04L 9/08* (2006.01)
*G06F 21/60* (2013.01)
(Continued)

(52) U.S. Cl.
CPC .......... *G06F 21/602* (2013.01); *G06F 16/182* (2019.01); *G06F 21/604* (2013.01);
(Continued)

(58) Field of Classification Search
CPC .... G06F 21/602; G06F 16/182; G06F 21/604; G09C 1/00; H04L 9/085; H04L 9/0861;
(Continued)

(56) References Cited

U.S. PATENT DOCUMENTS 10,026,118 B2 7/2018 Castinado et al.
10,601,585 B1 * 3/2020 Robinson .............. H04L 9/0894
(Continued)

FOREIGN PATENT DOCUMENTS

WO 2016063092 A1 4/2016
WO 2017127620 A1 7/2017
(Continued)

OTHER PUBLICATIONS

U.S. Appl. No. 16/252,008, filed Jan. 18, 2019.
(Continued)

*Primary Examiner* — Yogesh Paliwal
(74) *Attorney, Agent, or Firm* — Withrow & Terranova, PLLC

(57) ABSTRACT

Providing smart contracts including secrets encrypted with oracle-provided encryption keys using thresholding cryptosystems is disclosed. In one example, a contract creator encrypts sensitive data necessary for executing a smart contract into ciphertext with multiple symmetric cryptographic keys using a threshold cryptosystem, such that a subset of at least size R of the symmetric cryptographic keys are required to decrypt the ciphertext. The symmetric cryptographic keys are encrypted into wrappers using a public cryptographic key of a contract executor. Envelopes are generated using public cryptographic keys of corresponding contract oracles, where the envelopes include the wrappers encrypted using the public cryptographic keys, and policies that specify condition(s) precedent and are authenticated using the public cryptographic keys. The smart contract, including the envelopes, the ciphertext, and R, is then deployed to the contract executor. In this manner, the sensitive data is protected from unauthorized access within the smart contract.

20 Claims, 13 Drawing Sheets

(51) Int. Cl.
  *H04L 29/06* (2006.01)
  *G09C 1/00* (2006.01)
  *G06F 16/182* (2019.01)

(52) U.S. Cl.
  CPC ............... *G09C 1/00* (2013.01); *H04L 9/085* (2013.01); *H04L 9/0861* (2013.01); *H04L 63/0428* (2013.01); *H04L 63/166* (2013.01); *H04L 2463/062* (2013.01)

(58) Field of Classification Search
  CPC ............ H04L 63/0428; H04L 63/166; H04L 2463/062; H04L 2209/38; H04L 2209/56
  USPC ......................................................... 713/150
  See application file for complete search history.

(56) References Cited

U.S. PATENT DOCUMENTS

| | | | |
|---|---|---|---|
| 2002/0112171 | A1 | 8/2002 | Ginter et al. |
| 2012/0259759 | A1 | 10/2012 | Crist et al. |
| 2013/0121490 | A1 | 5/2013 | Boliek et al. |
| 2013/0232339 | A1 | 9/2013 | Ignatchenko et al. |
| 2015/0256336 | A1 | 9/2015 | Stiglic et al. |
| 2017/0085545 | A1 | 3/2017 | Lohe et al. |
| 2017/0287068 | A1 | 10/2017 | Nugent |
| 2018/0089758 | A1 | 3/2018 | Stradling et al. |
| 2018/0094953 | A1 | 4/2018 | Colson et al. |
| 2018/0097783 | A1 | 4/2018 | Haldenby et al. |
| 2018/0123804 | A1 | 5/2018 | Smith et al. |
| 2018/0191503 | A1 | 7/2018 | Alwar et al. |
| 2018/0218176 | A1* | 8/2018 | Voorhees .............. H04L 9/3213 |
| 2018/0227118 | A1 | 8/2018 | Bibera et al. |
| 2019/0035014 | A1 | 1/2019 | Bell et al. |
| 2019/0114706 | A1* | 4/2019 | Bell ...................... H04L 9/0825 |
| 2019/0158275 | A1 | 5/2019 | Beck |
| 2019/0220831 | A1* | 7/2019 | Rangarajan ........... H04L 9/3066 |
| 2020/0059454 | A1* | 2/2020 | Yang .................. H04L 63/0435 |
| 2020/0143337 | A1 | 5/2020 | Conroy et al. |
| 2020/0162252 | A1 | 5/2020 | Davis et al. |
| 2020/0175590 | A1* | 6/2020 | Huo ....................... G06Q 40/04 |
| 2020/0374272 | A1 | 11/2020 | Zhang et al. |
| 2020/0396079 | A1 | 12/2020 | Dekant et al. |
| 2020/0401734 | A1 | 12/2020 | Murdoch et al. |
| 2021/0035090 | A1 | 2/2021 | Iannaccone |
| 2021/0194890 | A1 | 6/2021 | Mohalik et al. |

FOREIGN PATENT DOCUMENTS

| | | |
|---|---|---|
| WO | 2018058105 A1 | 3/2018 |
| WO | 2018224431 A1 | 12/2018 |

OTHER PUBLICATIONS

Cardoso, Jose, "Blockchain and Smart Contracts for the Internet of Things—an Architecture for Sensor Data Availability," LISBOA 2018, 90 pages.

Curran, Brian, "What are Oracles? Smart Contracts, Chainlink & 'The Oracle Problem'," Sep. 19, 2018, blockonomi.com/oracles-guide/, Kooc Media Ltd., 13 pages.

Shrier, Allison, et al., "Blockchain and Health IT: Algorithms, Privacy, and Data," White Paper, Aug. 8, 2016, 166 pages.

Author Unknown, "Oraclize Documentation," docs.oraclize.it/#home, accessed on Jul. 26, 2018, 29 pages.

Author Unknown, "Is it possible to make a contract with an encrypted payload," Reddit thread, reddit.com/r/ethereum/comments/4kd77q/is_it_possible_to_make_a_contract_with_an/, accessed on Aug. 1, 2018, 4 pages.

Author Unknown, "Encrypted Queries: Private Data on a Public Blockchain," blog.oraclize.it/encrypted-queries-private-data-on-a-public-blockchain-71d893fac2bf, accessed on Jul. 26, 2018, 8 pages.

Bertani, Thomas, "Understanding oracles," Oraclize, blog.oraclize.it/understanding-oracles-99055c9c9f7b, Feb. 18, 2016, 5 pages.

Hertig, Alyssa, "How Ethereum Works," www.coindesk.com/information/how-ethereum-works, accessed Dec. 7, 2018, 5 pages.

Lin, Connor, et al., "A Price-Stable Cryptocurrency for Next-Generation Payments," Carbon, Version 1.0.0, Apr. 3, 2018, 21 pages.

Linder, Peter, "Decryption Contract Enforcement Tool (DECENT): A Practical Alternative to Government Decryption Backdoors," Technology Brief, Version 1.0, Mar. 31, 2016, IACR, 20 pages.

Mik, Eliza, "Smart contracts: Terminology, technical limitations and real world complexity," Law, Innovation and Technology, vol. 9, Issue 2, Oct. 2017, Research Collection School of Law, 27 pages.

Zhang, Fan, et al., "Town Crier: An Authenticated Data Feed for Smart Contracts," ACM Conference on Computer and Communications Security, Oct. 2016, Vienna, Austria, ACM, 20 pages.

Ellis, S. et al., "ChainLink: A Decentralized Oracle Network," V1.0, Sep. 4, 2017, 38 pages.

Non-Final Office Action for U.S. Appl. No. 16/252,008, dated Feb. 3, 2021, 29 pages.

Non-Final Office Action for U.S. Appl. No. 16/252,008, dated Jul. 29, 2021, 33 pages.

Non-Final Office Action for U.S. Appl. No. 16/282,052, dated Apr. 1, 2021, 16 pages.

Non-Final Office Action for U.S. Appl. No. 16/510,453, dated Aug. 31, 2021, 9 pages.

Non-Final Office Action for U.S. Appl. No. 16/252,008, dated Jan. 24, 2022, 26 pages.

Notice of Allowance for U.S. Appl. No. 16/282,052, dated Dec. 21, 2021, 9 pages.

* cited by examiner

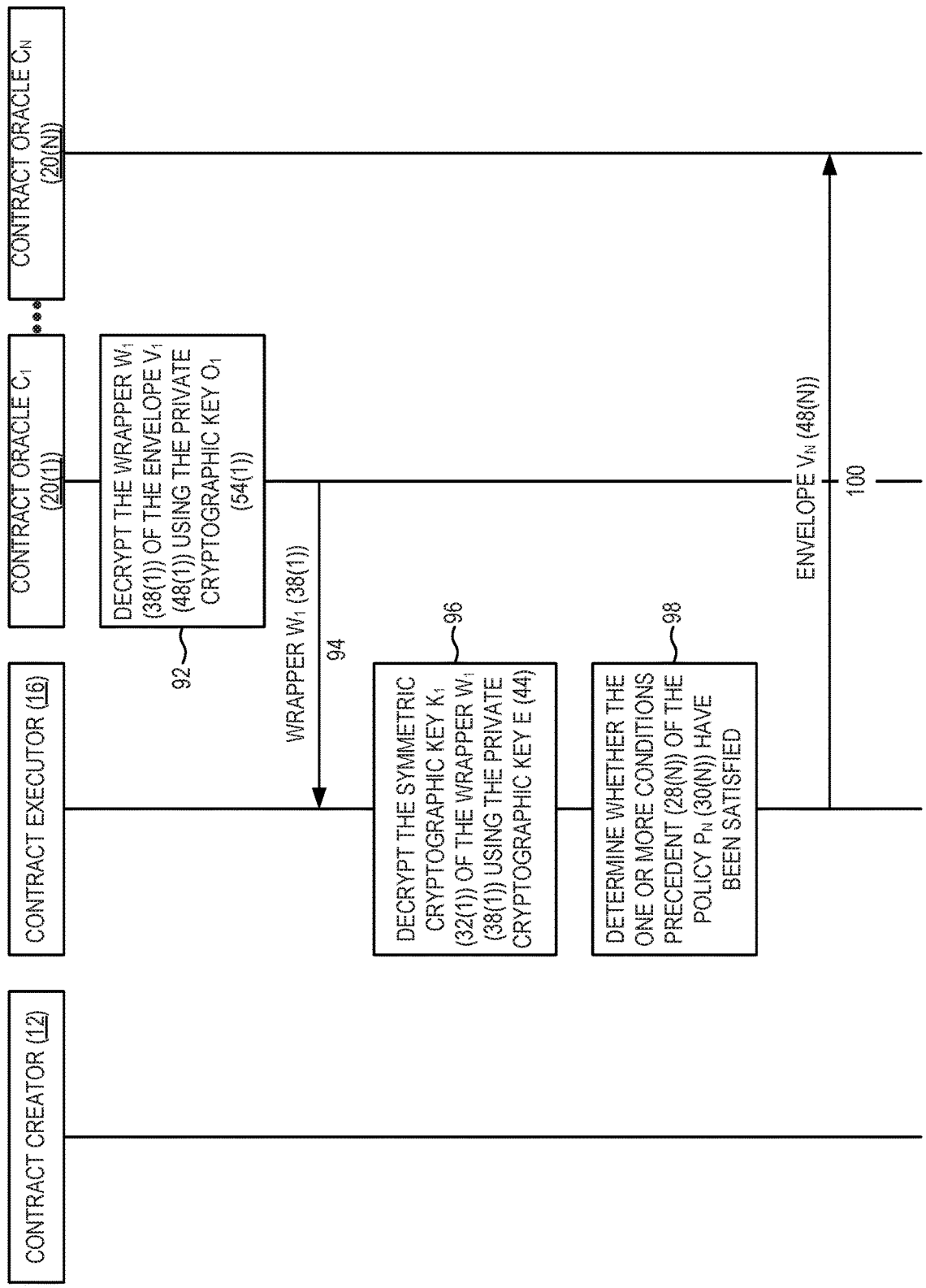

PROVIDING SMART CONTRACTS INCLUDING SECRETS ENCRYPTED WITH ORACLE-PROVIDED ENCRYPTION KEYS USING THRESHOLD CRYPTOSYSTEMS

TECHNICAL FIELD

The examples relate generally to smart contracts, such as smart contracts implemented using distributed ledgers provided by distributed ledger networks, and, in particular, to securing sensitive data within smart contracts.

BACKGROUND

Smart contracts, such as smart contracts provided by distributed ledger networks, are self-executing computer code containing logic that enables operations to be automatically performed upon satisfaction of one or more conditions precedent specified by a policy of the smart contract.

SUMMARY

The examples implement mechanisms whereby sensitive data necessary for executing a smart contract is encrypted into ciphertext (i.e., encrypted text) by a contract creator using a number N of symmetric cryptographic keys $K_1$-$K_N$, where N>1. The encryption of the sensitive data is accomplished using a threshold cryptosystem (e.g., the Shamir's Secret Sharing cryptosystem, as a non-limiting example) such that a subset of at least size R (where 1≤R≤N) of the symmetric cryptographic keys $K_1$-$K_N$ is required to decrypt the sensitive data. The contract creator encrypts the symmetric cryptographic keys $K_1$-$K_N$ into a corresponding plurality of wrappers $W_1$-$W_N$ using a public cryptographic key e of a contract executor, where the public cryptographic key e corresponds to a private cryptographic key E of the contract executor. The contract creator then generates a plurality of envelopes $V_1$-$V_N$ using corresponding public cryptographic keys $o_1$-$o_N$ of a plurality of contract oracles $C_1$-$C_N$, where each of the public cryptographic keys $o_1$-$o_N$ corresponds to a private cryptographic key $O_1$-$O_N$ of the respective contract oracle $C_1$-$C_N$. The envelopes $V_1$-$V_N$ each include the corresponding wrapper $W_1$-$W_N$, as well as a policy $P_1$-$P_N$ that specifies one or more conditions precedent and that is digitally authenticated. The smart contract, including the plurality of envelopes $V_1$-$V_N$, the ciphertext, and R, is then deployed by the contract creator to the contract executor. In this manner, the sensitive data required to execute the smart contract may be provided within the smart contract itself, while being protected from unauthorized access in the event the smart contract is malicious or is compromised.

In one example, a computing system is provided. The computing system comprises a contract creator comprising a first computing device that includes a first memory and a first processor device coupled to the first memory. The contract creator is to generate a plurality of symmetric cryptographic keys $K_1$-$K_N$, where N>1. The contract creator is further to encrypt sensitive data for a smart contract into ciphertext using the plurality of symmetric cryptographic keys $K_1$-$K_N$, based on a threshold cryptosystem requiring a subset of at least size R of the plurality of symmetric cryptographic keys $K_1$-$K_N$ to decrypt the ciphertext, where 1≤R≤N. The contract creator is also to encrypt the plurality of symmetric cryptographic keys $K_1$-$K_N$ into a corresponding plurality of wrappers $W_1$-$W_N$ using a public cryptographic key e of a contract executor, the public cryptographic key e corresponding to a private cryptographic key E of the contract executor. The contract creator is additionally to generate a plurality of envelopes $V_1$-$V_N$ using a corresponding plurality of public cryptographic keys $o_1$-$o_N$ of a corresponding plurality of contract oracles $C_1$-$C_N$. The plurality of public cryptographic keys $o_1$-$o_N$ correspond to a plurality of private cryptographic keys $O_1$-$O_N$ of the plurality of contract oracles $C_1$-$C_N$. The plurality of envelopes $V_1$-$V_N$ comprises the corresponding plurality of wrappers $W_1$-$W_N$ encrypted using the corresponding plurality of public cryptographic keys $o_1$-$o_N$, and a corresponding plurality of policies $P_1$-$P_N$, each digitally authenticated and comprising one or more conditions precedent. The contract creator is further to deploy, to the contract executor, the smart contract comprising the plurality of envelopes $V_1$-$V_N$, the ciphertext, and R.

In another example, a method is provided. The method comprises generating, by a contract creator comprising a first computing device, a plurality of symmetric cryptographic keys $K_1$-$K_N$, where N>1. The method further comprises encrypting, by the contract creator, sensitive data for a smart contract into ciphertext using the plurality of symmetric cryptographic keys $K_1$-$K_N$, based on a threshold cryptosystem requiring a subset of at least size R of the plurality of symmetric cryptographic keys $K_1$-$K_N$ to decrypt the ciphertext, where 1≤R≤N. The method also comprises encrypting, by the contract creator, the plurality of symmetric cryptographic keys $K_1$-$K_N$ into a corresponding plurality of wrappers $W_1$-$W_N$ using a public cryptographic key e of a contract executor comprising a second computing device, the public cryptographic key e corresponding to a private cryptographic key E of the contract executor. The method additionally comprises generating, by the contract creator, a plurality of envelopes $V_1$-$V_N$ using a corresponding plurality of public cryptographic keys $o_1$-$o_N$ of a corresponding plurality of contract oracles $C_1$-$C_N$, each comprising a computing device, wherein the plurality of public cryptographic keys $o_1$-$o_N$ correspond to a plurality of private cryptographic keys $O_1$-$O_N$ of the plurality of contract oracles $C_1$-$C_N$, and the plurality of envelopes $V_1$-$V_N$ comprises a corresponding plurality of wrappers $W_1$-$W_N$ encrypted using the corresponding plurality of public cryptographic keys $o_1$-$o_N$, and a corresponding plurality of policies $P_1$-$P_N$, each digitally authenticated and comprising one or more conditions precedent. The method further comprises deploying, by the contract creator to the contract executor, the smart contract comprising the plurality of envelopes $V_1$-$V_N$, the ciphertext, and R.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 2A-2F are messaging diagrams illustrating communication flows among elements of the computing system of FIG. 1 for providing smart contracts including sensitive data encrypted with multiple oracle-provided encryption keys, according to one example;
}

DETAILED DESCRIPTION

Figure 1:
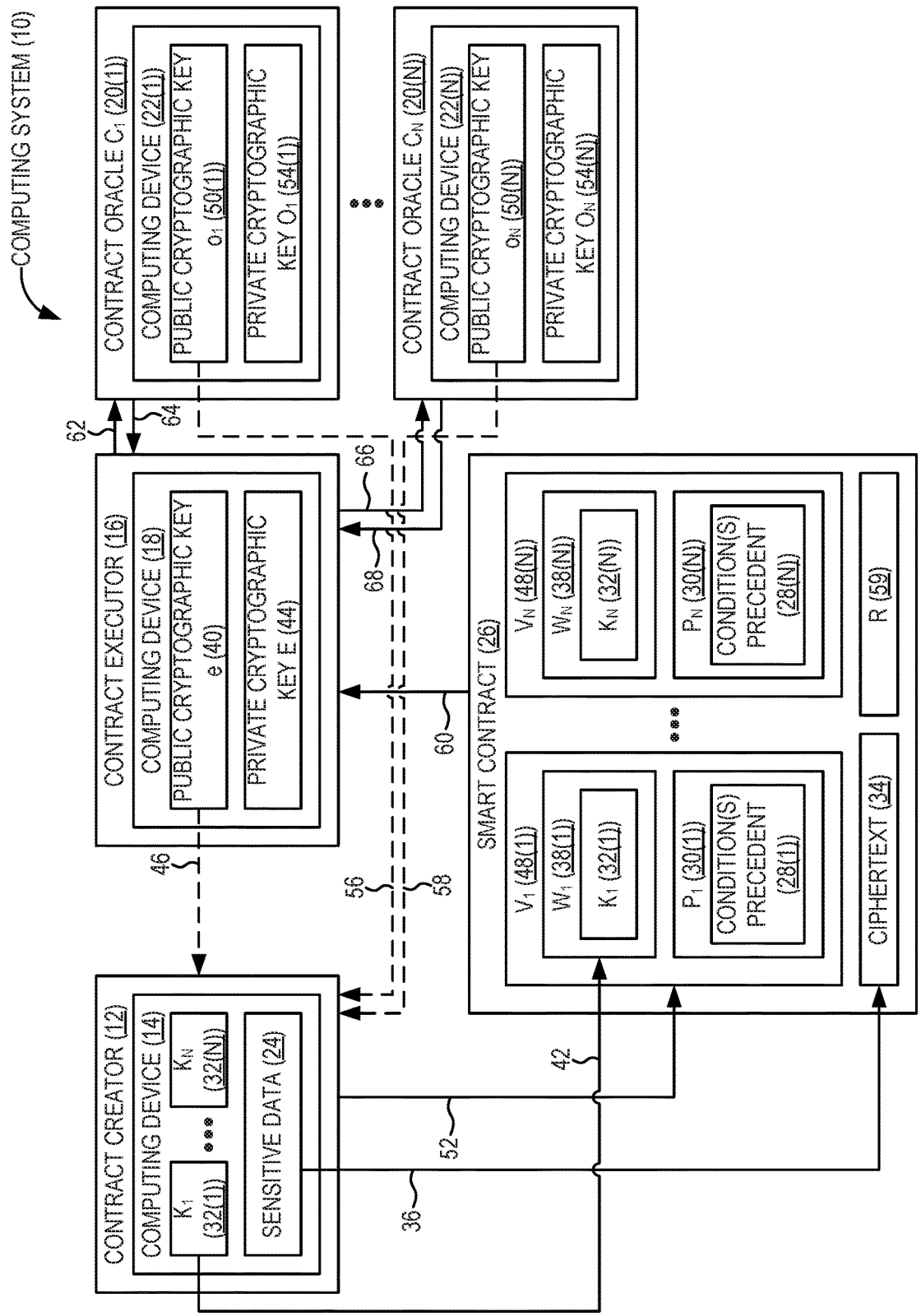
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first computing device" and "second computing device," and does not imply a priority, a type, an importance, or other attribute, unless otherwise stated herein. As used herein and in the claims, the articles "a" and "an" in reference to an element refers to "one or more" of the element unless otherwise explicitly specified.

A smart contract is executable computer code that specifies a policy under which digital assets may be automatically redistributed among parties to the smart contract. The policy specifies one or more conditions precedent that must be satisfied before the smart contract is automatically enforced. Once the condition(s) precedent are met, a contract executor (which, in some examples, may comprise a node of a distributed ledger network) automatically carries out the terms of the smart contract by executing one or more operations specified by the smart contract code. In this manner, the smart contract enables automatic verification and performance of an agreement or transaction. Smart contract functionality may be provided by a distributed ledger network, such as the blockchain-based Bitcoin, Ethereum, and Litecoin distributed ledger networks.

For some smart contracts, the condition(s) precedent that determine whether or not the smart contract should be executed may be based on external data that is only available from sources external to the contract executor. Accordingly, to evaluate whether the condition(s) precedent have been satisfied, the contract executor may obtain or receive the external data from a third party agent referred to as a "contract oracle." The contract oracle may be configured to provide access to any type of data, such as (but not limited to) weather conditions, account balances, and/or current or historical prices of commodities, goods, and/or services. Additionally, the data provided by a contract oracle may be obtained by the contract oracle from online sources and/or from hardware sensors, as non-limiting examples.

Many smart contracts may require the contract executor to provide sensitive data in order to perform operations specified by the smart contract when the condition(s) precedent have been satisfied. For instance, a smart contract may specify that, if and when the price of a given stock falls below a specified level, a stock purchase operation will be automatically performed. The stock purchase operation may require a cryptographic key for authentication and security purposes. However, it may be undesirable to store sensitive data such as the cryptographic key within the smart contract itself, as such sensitive data may be exposed if the smart contract is malicious or has been compromised. Moreover, in examples where execution of the smart contract is based on data received from multiple contract oracles, it may be desirable for the smart contract to be executed only with the assent of some subset (e.g., more than half, as a non-limiting example) of the contract oracles.

To address these issues, examples described herein provide a mechanism for using a threshold cryptosystem (e.g., the Shamir's Secret Sharing cryptosystem, as a non-limiting example) to encrypt the sensitive data necessary for executing the smart contract into ciphertext (i.e., encrypted text) using a number N of symmetric cryptographic keys $K_1$-$K_N$, where N>1, such that a subset of at least size R (where 1≤R≤) of the symmetric cryptographic keys $K_1$-$K_N$ is required to decrypt the sensitive data. The symmetric cryptographic keys $K_1$-$K_N$ are then encrypted into a corresponding plurality of wrappers $W_1$-$W_N$ using a public cryptographic key e of a contract executor, where the public cryptographic key e corresponds to a private cryptographic key E of the contract executor. Next, a plurality of envelopes $V_1$-$V_N$ are generated using corresponding public cryptographic keys $o_1$-$o_N$ of a plurality of contract oracles $C_1$-$C_N$, where each of the public cryptographic keys $o_1$-$o_N$ corresponds to a private cryptographic key $O_1$-$O_N$ of the respective contract oracle $C_1$-$C_N$. The envelopes $V_1$-$V_N$ each include a corresponding respective wrapper $W_1$-$W_N$, as well as a policy $P_1$-$P_N$ that specifies one or more conditions precedent and that is digitally authenticated. The smart contract, including the plurality of envelopes $V_1$-$V_N$, the ciphertext, and R, is then deployed to the contract executor. The sensitive data required to execute the smart contract thus may be provided in a secure form within the smart contract itself.

In this regard, FIG. 1 illustrates a computing system 10 for providing smart contracts including secrets encrypted with oracle-provided encryption keys using threshold cryptosystems. The computing system 10 of FIG. 1 includes a contract creator 12 comprising a computing device 14, a contract executor 16 comprising a computing device 18, and a plurality of contract oracles 20(1)-20(N) comprising respective computing devices 22(1)-22(N). In some examples, the contract executor 16 may comprise a node of a distributed ledger network (e.g., a Bitcoin, Litecoin, or Ethereum distributed ledger network, as non-limiting examples) that maintains a local copy of a distributed ledger (e.g., a blockchain, as a non-limiting example). The contract creator 12, the contract executor 16, and the contract oracles 20(1)-20(N) ("$C_1$-$C_N$") are each communicatively coupled to the others.

The contract creator 12 in the example of FIG. 1 maintains sensitive data 24, which represents any sensitive data that is required to carry out an operation to be performed by a smart contract 26 upon satisfaction of sets of one or more conditions precedent 28(1)-28(N) of a plurality of policies 30(1)-30(N) ("$P_1$-$P_N$") of the smart contract 26. Each of the plurality of policies 30(1)-30(N) corresponds to a contract oracle of the contract oracles 20(1)-20(N), and, in some examples, the condition(s) precedent 28(1)-28(N) of the plurality of policies 30(1)-30(N) may be unique to the respective contract oracles 20(1)-20(N). According to some examples, the sensitive data 24 may comprise a cryptographic key for authenticating an identity of a user of the contract creator 12 and/or for authorizing an operation on behalf of a user of the contract creator 12, as non-limiting examples.

Instead of storing the sensitive data 24 directly within the smart contract 26, the contract creator 12 generates a plurality of symmetric cryptographic keys 32(1)-32(N) ("$K_1$-$K_N$"), and uses the symmetric cryptographic keys 32(1)-32(N) to encrypt the sensitive data 24 as ciphertext 34, as indicated by arrow 36. Encryption of the sensitive data 24 using the symmetric cryptographic keys 32(1)-32(N) is performed according to a threshold cryptosystem that requires a specified subset of at least size R (where $1 \leq R \leq N$) of the symmetric cryptographic keys 32(1)-32(N) to decrypt the ciphertext 34. Some examples may provide that the threshold cryptosystem is the Shamir's Secret Sharing cryptosystem, as a non-limiting example.

Each of the symmetric cryptographic keys 32(1)-32(N) are then encrypted into respective wrappers 38(1)-38(N) ("$W_1$-$W_N$") using a public cryptographic key e 40 of the contract executor 16. Arrow 42 of FIG. 1 indicates the encryption of the symmetric cryptographic key 32(1) ("$K_1$") into the wrapper 38(1) ("$W_1$"), and it is to be understood that corresponding operation(s) are also performed for the other symmetric cryptographic keys 32(1)-32(N). The public cryptographic key e 40 of the contract executor 16 corresponds to a private cryptographic key E 44 of the contract executor 16, and, in some examples, may be provided by the contract executor 16 to the contract creator 12, as indicated by arrow 46. Consequently, only the contract executor 16, the holder of the private cryptographic key E 44, is able to decrypt the wrappers 38(1)-38(N) containing the symmetric cryptographic keys 32(1)-32(N) of the contract creator 12.

After encrypting the plurality of symmetric cryptographic keys 32(1)-32(N) into the wrappers 38(1)-38(N), the contract creator 12 generates a respective plurality of envelopes 48(1)-48(N) ("$V_1$-$V_N$") using public cryptographic keys 50(1)-50(N) ("$o_1$-$o_N$") of the plurality of contract oracles 20(1)-20(N) to authenticate and encrypt the corresponding wrapper 38(1)-38(N) and also to digitally authenticate (but not encrypt) the corresponding policy 30(1)-30(N). Arrow 52 of FIG. 1 indicates the generation of the envelope 48(1) ("$V_1$"), and it is to be understood that corresponding operation(s) are also performed to generate the other envelopes 48(1)-48(N). Each of the public cryptographic keys 50(1)-50(N) corresponds to one of a plurality of private cryptographic keys 54(1)-54(N) ("$O_1$-$O_N$") of the respective contract oracles 20(1)-20(N), and, in some examples, may be provided by the contract oracles 20(1)-20(N) to the contract creator 12, as indicated by arrows 56 and 58. Each of the envelopes 48(1)-48(N) generated by the contract creator 12 includes the corresponding wrapper 38(1)-38(N) further authenticated and encrypted using the public cryptographic key 50(1)-50(N) of the respective contract oracle 20(1)-20(N) (e.g., using an authenticated encryption with associated data (AEAD) encryption method, as a non-limiting example). Each of the envelopes 48(1)-48(N) also includes the corresponding policy 30(1)-30(N), which is digitally authenticated but not encrypted (e.g., using the AEAD encryption method, as a non-limiting example), and which may comprise a header or metadata of the envelope 48(1)-48(N) in some examples. As a result, only the respective contract oracle 20(1)-20(N), the holder of the private cryptographic key 54(1)-54(N), is able to authenticate the corresponding policy 30(1)-30(N) and decrypt the corresponding wrapper 38(1)-38(N). Thus, for example, only the contract oracle 20(1) can authenticate the policy 30(1) and decrypt the wrapper 38(1) encrypted using the public cryptographic key 50(1), and only the contract oracle 20(N) can authenticate the policy 30(N) and decrypt the wrapper 38(N) encrypted using the public cryptographic key 50(N).

The contract creator 12 then deploys the smart contract 26, containing the envelopes 48(1)-48(N), the ciphertext 34, and the required subset size R 59, to the contract executor 16, as indicated by arrow 60. In some examples, the contract creator 12 may encrypt the envelopes 48(1)-48(N) of the smart contract 26 prior to deploying the smart contract 26 to the contract executor 16. However, encrypting the envelopes 48(1)-48(N) may not be necessary in examples in which the contract creator 12 is configured to deploy the smart contract 26 to the contract executor 16 using a secure transport protocol such as Secure Sockets Layer (SSL) and/or Transport Layer Security (TLS), as non-limiting examples.

As noted above, the ciphertext 34 can only be decrypted with a subset of at least size R (where $1 \leq R \leq N$) of the symmetric cryptographic keys 32(1)-32(N) used to encrypt the sensitive data 24. Accordingly, the smart contract 26 can only be executed after at least a number R of the plurality of policies 30(1)-30(N) have been satisfied. Thus, in some examples, the contract executor 16 to which the smart contract 26 was deployed may determine, for each policy $P_X$ in a subset of at least size R of the plurality of policies 30(1)-30(N), whether the one or more conditions precedent 28 of the policy $P_X$ of the smart contract 26 have been satisfied. In examples in which $P_X$ is the policy 30(1) ("$P_1$"), the contract executor 16 determines whether the condition(s) precedent 28(1) of the policy 30(1) have been satisfied. If so, the contract executor 16 needs to obtain the wrapper 38(1) in order to obtain the symmetric cryptographic key 32(1). However, recall that the wrapper 38(1), which contains the symmetric cryptographic key 32(1), was encrypted using the public cryptographic key 50(1) of the contract oracle 20(1).

Accordingly, the contract executor 16 transmits the envelope 48(1) of the smart contract 26 to the contract oracle 20(1), as indicated by arrow 62. After receiving the envelope 48(1), the contract oracle 20(1) confirms that the condition(s) precedent 28(1) of the policy 30(1) of the smart contract 26 have been satisfied. If so, the contract oracle 20(1) decrypts the wrapper 38(1) using the private cryptographic key 54(1), and transmits the wrapper 38(1) back to the contract executor 16, as indicated by arrow 64. Note that, in some examples, the contract oracle 20(1) may opt to decrypt the wrapper 38(1) prior to evaluating the policy 30(1), rather than subsequent to evaluating the policy 30(1). The contract executor 16 then decrypts the symmetric cryptographic key 32(1) of the wrapper 38(1) using the private cryptographic key E 44.

A similar sequence of operation may be carried out when $P_X$ is the policy 30(N) ("$P_N$"). The contract executor 16 transmits the envelope 48(N) of the smart contract 26 to the contract oracle 20(N), as indicated by arrow 66. Upon receiving the envelope 48(N), the contract oracle 20(N)

evaluates the condition(s) precedent 28(N) of the policy 30(N) of the smart contract 26. If the condition(s) precedent 28(N) have been satisfied, the contract oracle 20(N) decrypts the wrapper 38(N) using the private cryptographic key 54(N), and transmits the wrapper 38(N) back to the contract executor 16, as indicated by arrow 68. The contract executor 16 then decrypts the symmetric cryptographic key 32(N) of the wrapper 38(N) using the private cryptographic key E 44.

Once a subset of at least size R of the symmetric cryptographic keys 32(1)-32(N) have been decrypted by the contract executor, the contract executor uses the decrypted symmetric cryptographic keys 32(1)-32(N) to decrypt the sensitive data 24 of the ciphertext 34 of the smart contract 26. The contract executor 16 then executes the smart contract 26 using the sensitive data 24.

The utility of the computing system 10 may be illustrated by an example use case. Assume that the purpose of the smart contract 26 is to sell shares of a mutual fund comprising 1000 stocks if, at a specified time, more than half (i.e., R=501 in this example) of the constituent stocks have each decreased in value by 10%, as determined by stock price agents represented by the contract oracles 20(1)-20(N) (i.e., N=1000 in this example). The contract creator 12 thus generates the smart contract 26 indicating the one or more conditions precedent 28(1)-28(N), specifying the respective threshold stock prices as determined by the contract oracles 20(1)-20(N). To perform the sell operation, the contract creator 12 must provide the sensitive data 24, which, in this example use case, comprises authentication information for the mutual fund broker. Accordingly, the contract creator 12 encrypts the sensitive data 24 and the symmetric cryptographic keys 32(1)-32(N) as described above, and then deploys the smart contract 26 to the contract executor 16. At a later point in time, the contract executor 16 determines that at least 501 of the constituent stocks have decreased in value by 10% or more, and thus interacts with the respective contract oracles 20(1)-20(N) as described above to obtain 501 of the symmetric cryptographic keys 32(1)-32(N). The contract executor 16 then decrypts the ciphertext 34 to obtain the sensitive data 24, and uses the sensitive data 24 to execute the sell operation.

FIGS. 2A-2F illustrate communication flows among the elements of the computing system 10 of FIG. 1 for providing smart contracts including sensitive data, according to one example. Elements of FIG. 1 are referenced in describing FIGS. 2A-2F for the sake of clarity. As seen in FIGS. 2A-2F, each of the contract creator 12, the contract executor 16, and the contract oracles 20(1) and 20(N) are represented by vertical lines, with communications between these elements illustrated by captioned arrows, and operations performed by each element illustrated by captioned boxes.

Figure 2A:
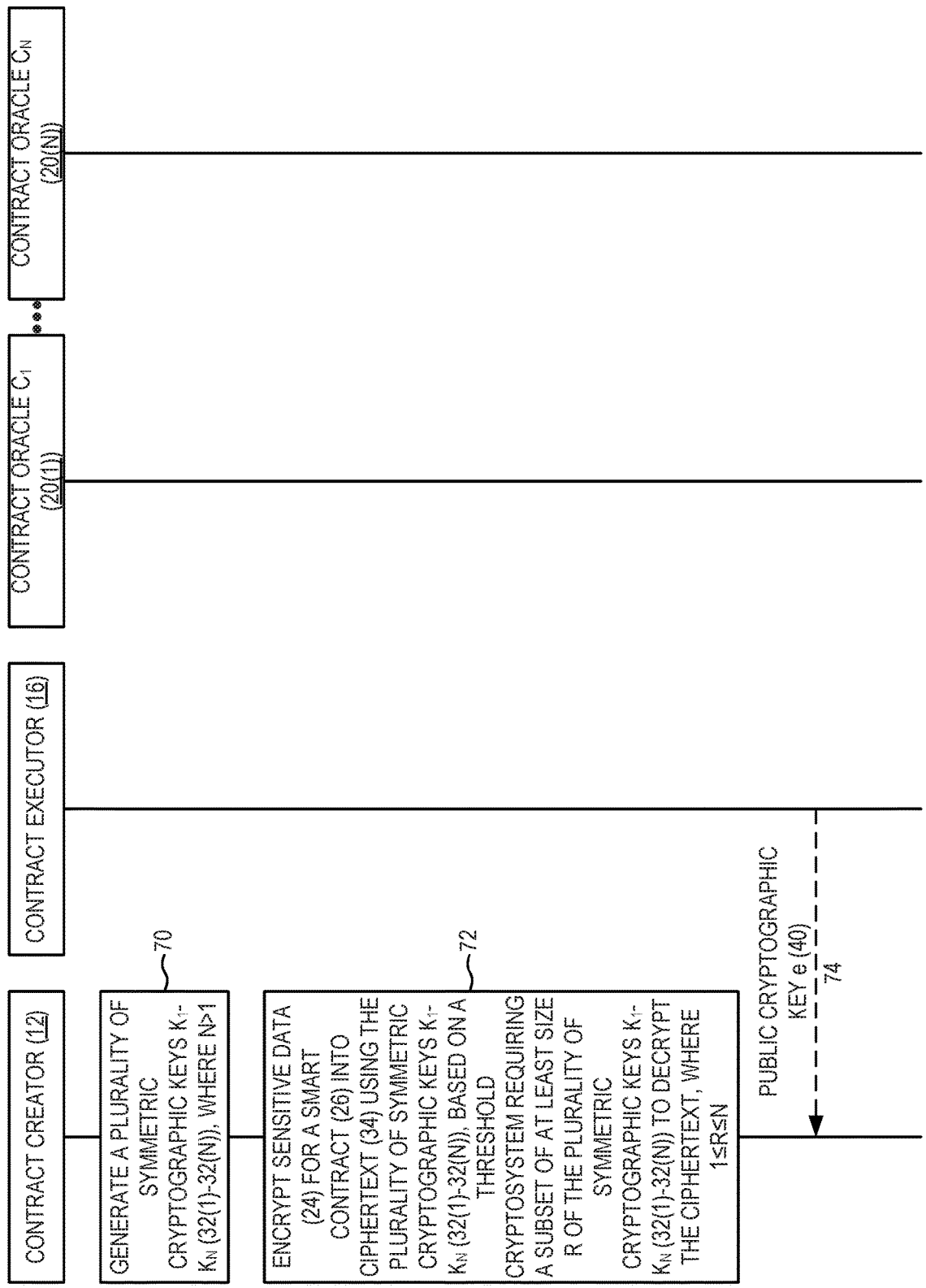

In the example of FIG. 2A, operations begin with the contract creator 12 generating the plurality of symmetric cryptographic keys 32(1)-32(N) ("$K_1$-$K_N$") where N>1, as indicated by box 70. The contract creator 12 encrypts the sensitive data 24 for the smart contract 26 into the ciphertext 34 using the plurality of symmetric cryptographic keys 32(1)-32(N), based on a threshold cryptosystem requiring a subset of at least size R (where 1≤R≤N) of the plurality of symmetric cryptographic keys $K_1$-$K_N$ 32(1)-32(N) to decrypt the ciphertext, as indicated by box 72. In some examples, the contract creator 12 may receive the public cryptographic key e 40 from the contract executor 16 as indicated by arrow 74. Operations then continue in FIG. 2B.

Figure 2B:
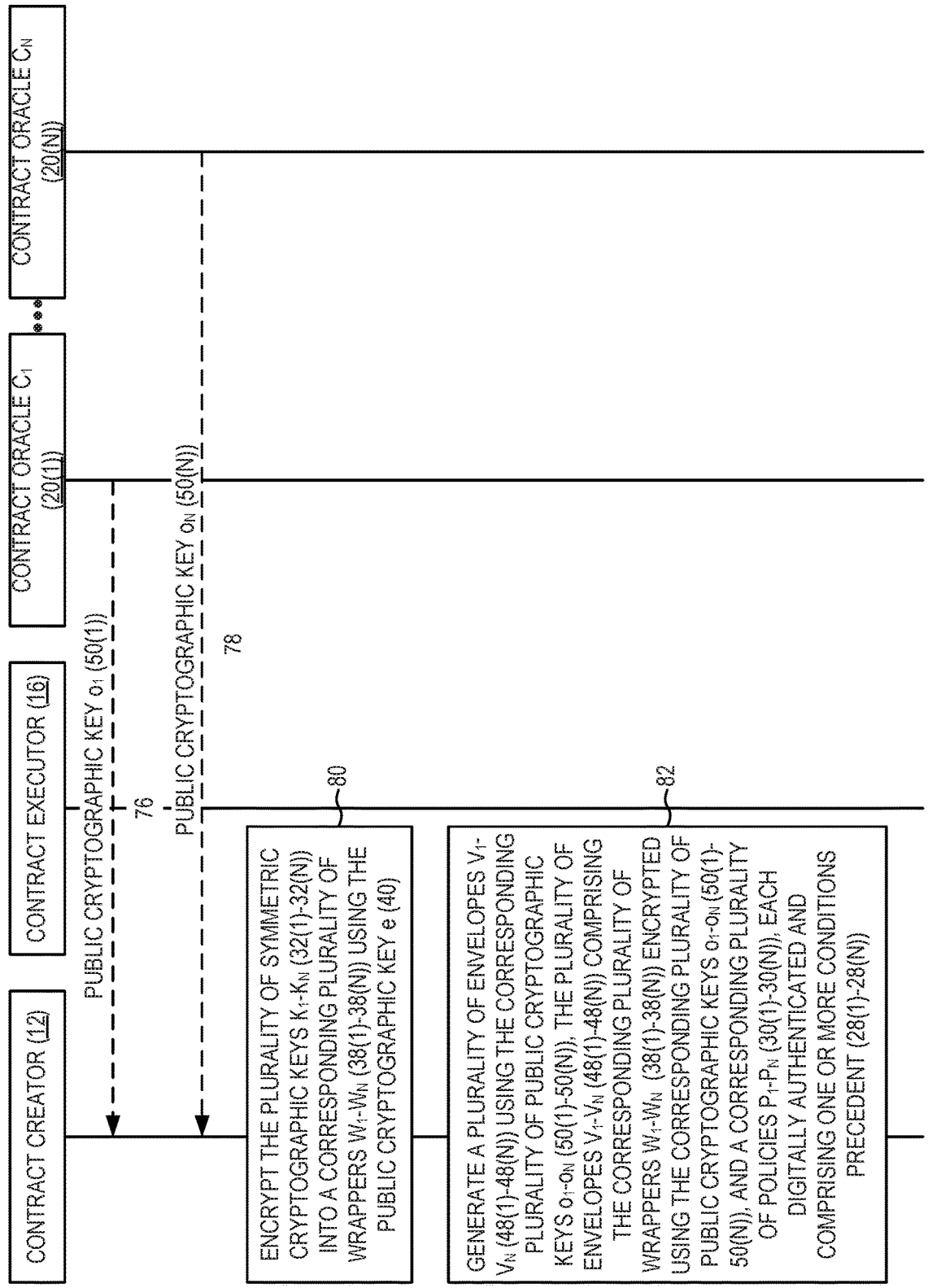

Referring now to FIG. 2B, the contract creator 12 in some examples may also receive the public cryptographic key 50(1) from the contract oracle 20(1), as indicated by arrow 76. Likewise, the contract creator 12 may receive the public cryptographic key 50(N) from the contract oracle 20(N), as indicated by arrow 78. The contract creator 12 then encrypts the plurality of symmetric cryptographic keys 32(1)-32(N) into the corresponding plurality of wrappers 38(1)-38(N) ("$W_1$-$W_N$") using the public cryptographic key e 40, as indicated by block 80. The contract creator 12 generates the plurality of envelopes 48(1)-48(N) ("$V_1$-$V_N$") using the corresponding plurality of public cryptographic keys 50(1)-50(N) ("$o_1$-$o_N$"), as indicated by block 82. The plurality of envelopes 48(1)-48(N) comprises the corresponding plurality of wrappers $W_1$-$W_N$ 38(1)-38(N), encrypted using the corresponding plurality of public cryptographic keys 50(1)-50(N), as well as the corresponding plurality of policies 30(1)-30(N) ("$P_1$-$P_N$"), each digitally authenticated and comprising the one or more conditions precedent 28(1)-28(N). Operations then continue in FIG. 2C.

Figure 2C:
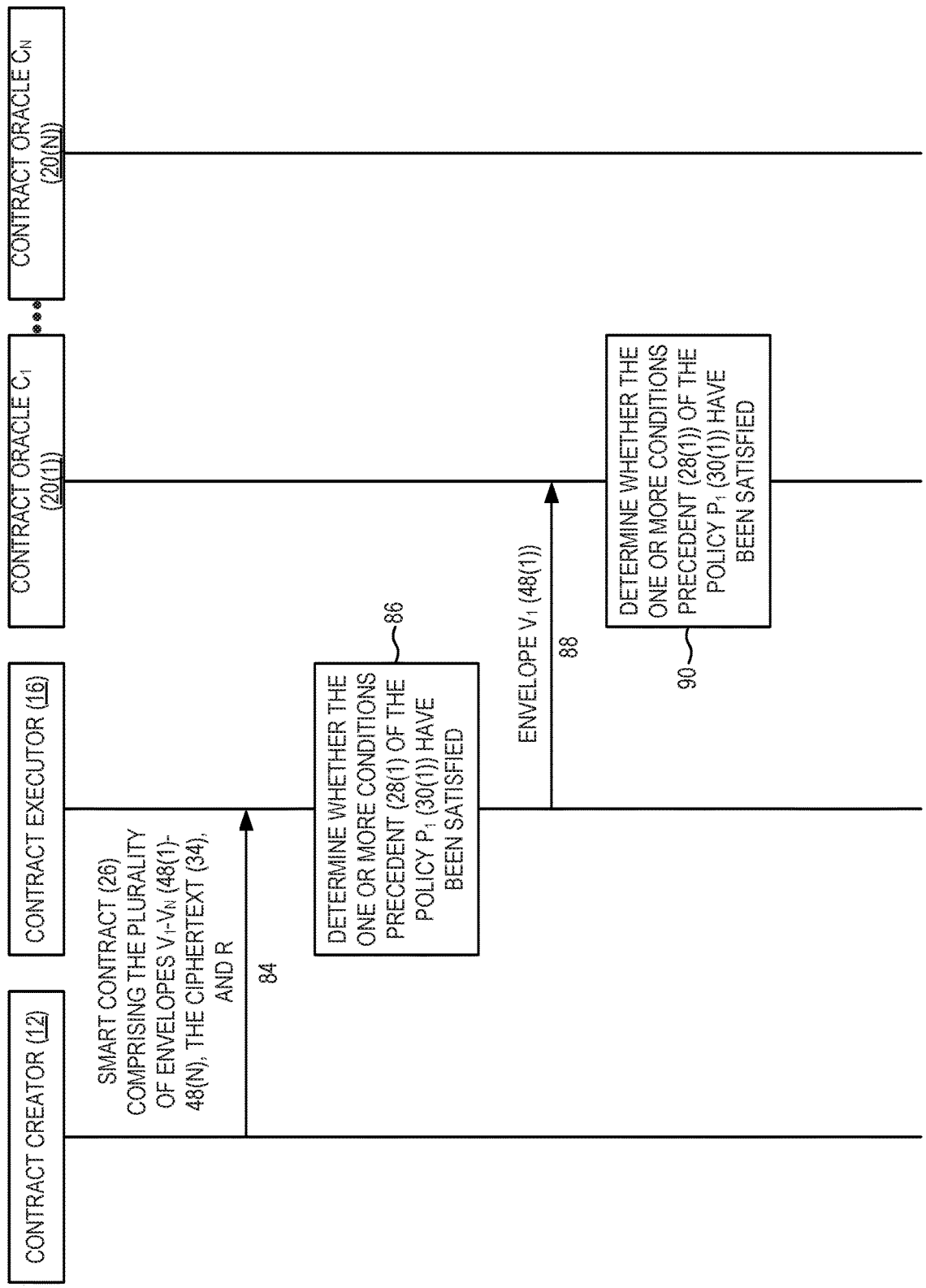

Turning to FIG. 2C, the contract creator 12 then deploys the smart contract 26 comprising the plurality of envelopes 48(1)-48(N), the ciphertext 34, and the value R to the contract executor 16, as indicated by arrow 84. At a later time, the contract executor 16 may evaluate the policies 30(1)-30(N) to determine whether a subset of at least size R of the policies 30(1)-30(N) have been satisfied (and thus the smart contract 26 can be executed). Accordingly, the contract executor 16 may perform operations in concert with one or more of the contract oracles 20(1)-20(N) to retrieve one or more of the symmetric cryptographic keys 32(1)-32(N) required to decrypt the ciphertext 34 and execute the smart contract 26. In this regard, in the example discussed in FIGS. 2C-2F, it is assumed that only the symmetric cryptographic keys 32(1) and 32(N) are required to decrypt the ciphertext 34. However, it is to be understood that the operations described herein may be performed by the contract executor 16 in relation to a number R of the symmetric cryptographic keys 32(1)-32(N).

Hence, the contract executor 16 determines whether the one or more conditions precedent 28(1) of the policy 30(1) ("$P_1$") have been satisfied, as indicated by block 86. If so, the contract executor 16 transmits the envelope 48(1) ("$V_1$") to the corresponding contract oracle 20(1) ("$C_1$"), as indicated by arrow 88. Upon receiving the envelope 48(1), the contract oracle 20(1) also determines whether the one or more conditions precedent 28(1) of the policy 30(1) ("$P_1$") have been satisfied, as indicated by block 90. Operations then continue in FIG. 2D.

In FIG. 2D, the contract oracle 20(1) decrypts the wrapper 38(1) ("$W_1$") of the envelope 48(1) using the private cryptographic key 54(1) COO, as indicated by block 92. Note that, in some examples such as those in which the evaluation of the one or more conditions precedent 28(1) of the policy 30(1) may cause a state change within the contract oracle 20(1), the contract oracle 20(1) may decrypt the wrapper 38(1) prior to determining whether the one or more conditions precedent 28(1) of the policy 30(1) ("$P_1$") have been satisfied. The contract oracle 20(1) then transmits the decrypted wrapper 38(1) back to the contract executor 16, as indicated by arrow 94. After receiving the wrapper 38(1), the contract executor 16 decrypts the symmetric cryptographic key 32(1) ("$K_1$") of the wrapper 38(1) using the private cryptographic key 44 ("E"), as indicated by box 96.

The contract executor also performs a similar series of operations with respect to the contract oracle 20(N) ("$C_N$"). The contract executor 16 first determines whether the one or more conditions precedent 28(N) of the policy 30(N) ("$P_N$") have been satisfied, as indicated by block 98. If so, the contract executor 16 transmits the envelope 48(N) ("$V_N$") to the corresponding contract oracle 20(N) ("$C_N$"), as indicated by arrow 100. Operations then continue in FIG. 2E.

Figure 2E:
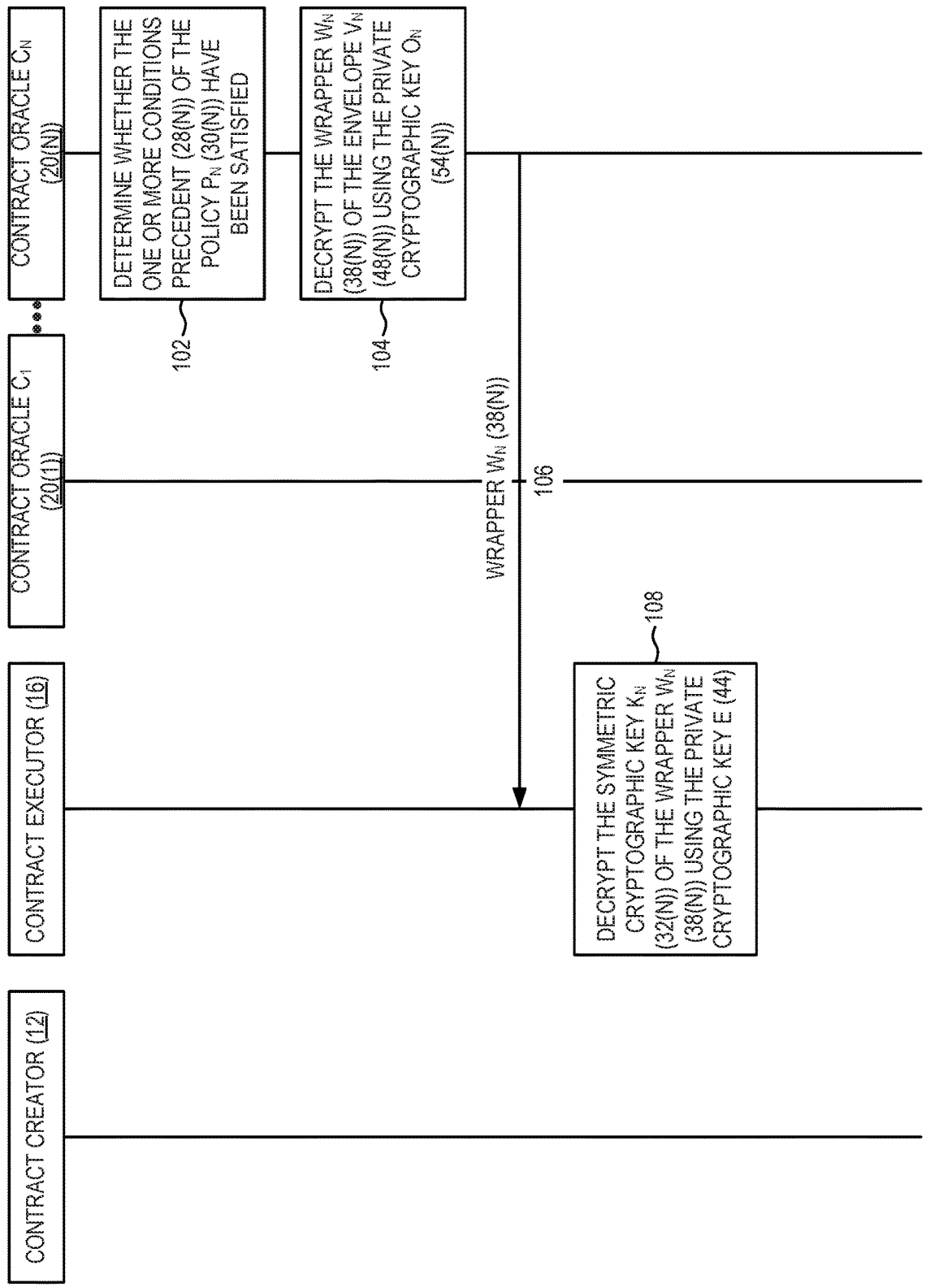

Referring now to FIG. 2E, the contract oracle 20(N), after receiving the envelope 48(N), also determines whether the one or more conditions precedent 28(N) of the policy 30(N) ("$P_N$") have been satisfied, as indicated by block 102. If so, the contract oracle 20(N) decrypts the wrapper 38(N) ("$W_N$") of the envelope 48(N) using the private cryptographic key 54(N) ("$O_N$"), as indicated by block 104. The contract oracle 20(N) next transmits the decrypted wrapper 38(N) back to the contract executor 16, as indicated by arrow 106. Upon receiving the wrapper 38(N), the contract executor 16 decrypts the symmetric cryptographic key 32(N) ("$K_N$") of the wrapper 38(N) using the private cryptographic key 44 ("E"), as indicated by box 108. Operations then continue in FIG. 2F.

Figure 2F:
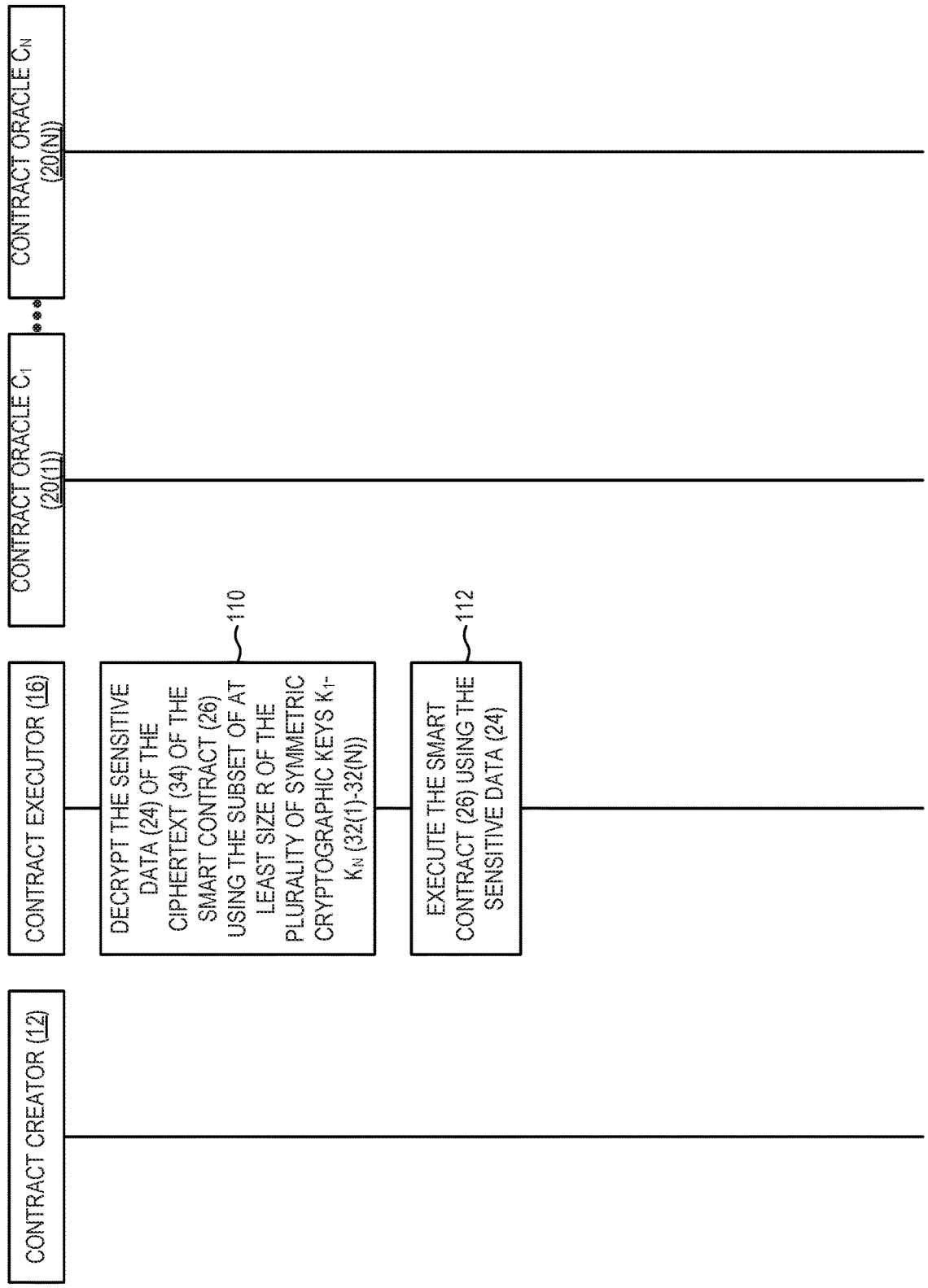

Turning now to FIG. 2F, once the contract executor 16 has received and decrypted a subset of at least size R of the plurality of symmetric cryptographic keys 32(1)-32(N) (i.e., the symmetric cryptographic keys 32(1) and 32(N) in the present example), the contract executor 16 decrypts the sensitive data 24 of the ciphertext 34 of the smart contract 26 using the subset of at least size R of the plurality of symmetric cryptographic keys 32(1)-32(N), as indicated by box 110. The contract executor 16 then executes the smart contract 26 using the sensitive data 24, as indicated by box 112.

Figure 3A:
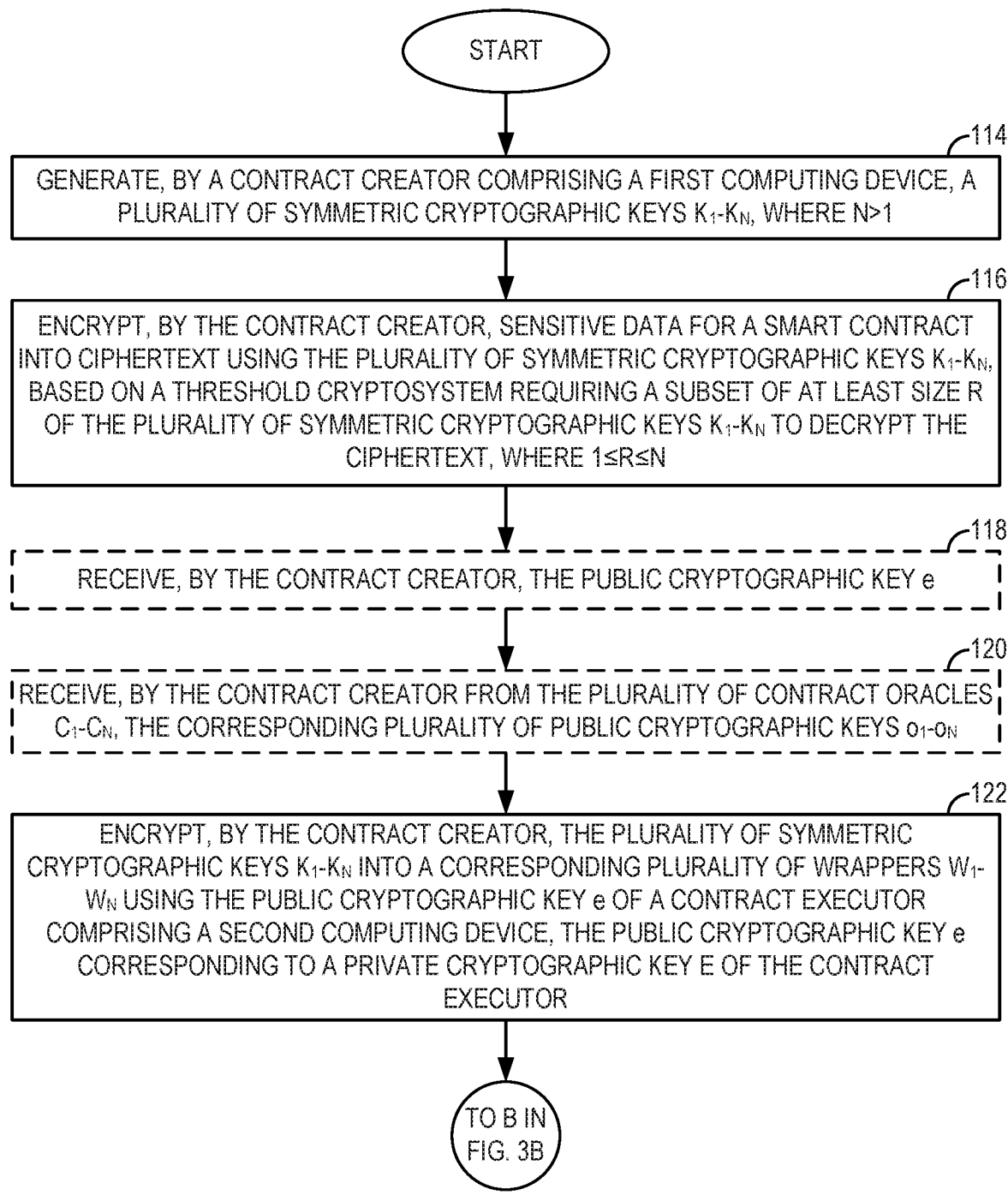
FIGS. 3A and 3B are flowcharts illustrating operations providing smart contracts including encryption of sensitive data using multiple oracle-provided encryption keys according to a threshold cryptosystem, according to one example.
Figure 3B:
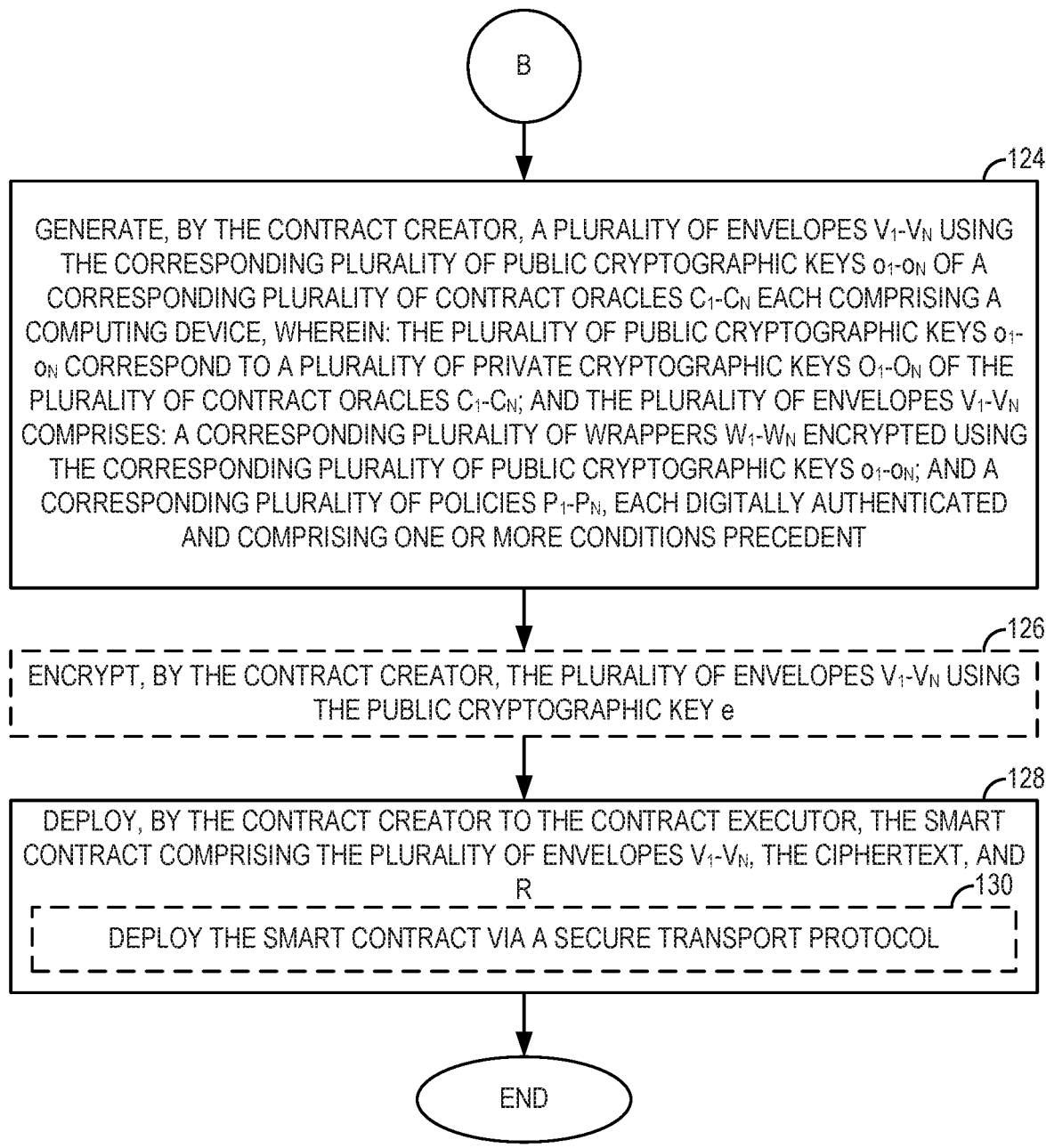

To illustrate operations for providing smart contracts including encryption of sensitive data with multiple oracle-provided encryption keys using threshold cryptosystems, FIGS. 3A and 3B are provided. For the sake of clarity, elements of FIG. 1 are referenced in describing FIGS. 3A and 3B. Operations in FIG. 3A begin with the contract creator 12 of FIG. 1 generating the plurality of symmetric cryptographic keys 32(1)-32(N) ("$K_1$-$K_N$") where N>1 (block 114). The contract creator 12 then encrypts the sensitive data 24 for the smart contract 26 into the ciphertext 34 using the plurality of symmetric cryptographic keys 32(1)-32(N), based on a threshold cryptosystem requiring a subset of at least size R of the plurality of symmetric cryptographic keys $K_1$-$K_N$ 32(1)-32(N) to decrypt the ciphertext, where 1≤R≤N (block 116).

According to some examples, the contract creator 12 may receive the public cryptographic key 40 ("e") (e.g., from the contract executor 16) (block 118). Similarly, in some examples, the contract creator 12 may receive the corresponding plurality of public cryptographic keys 50(0)-50(N) ("$o_1$-$o_N$") (e.g., from the plurality of contract oracles 20(1)-20(N)) (block 120). The contract creator 12 then encrypts the plurality of symmetric cryptographic keys 32(1)-32(N) into a corresponding plurality of wrappers 38(1)-38(N) ("$W_1$-$W_N$") using the public cryptographic key 40 ("e") of the contract executor 16, the public cryptographic key 40 ("e") corresponding to a private cryptographic key 44 ("E") of the contract executor 16 (block 122). Processing then resumes at block 124 of FIG. 3B.

Turning now to FIG. 3B, the contract creator 12 next generates the plurality of envelopes 48(1)-48(N) ("$V_1$-$V_N$") using the corresponding plurality of public cryptographic keys 50(1)-50(N) (block 124). The plurality of envelopes 48(1)-48(N) comprises the corresponding plurality of wrappers 38(1)-38(N) ("$W_1$-$W_N$") encrypted using the corresponding plurality of public cryptographic keys 50(1)-50(N), as well as the corresponding plurality of policies 30(1)-30(N) ("$P_1$-$P_N$"), each digitally authenticated and comprising the one or more conditions precedent 28(1)-28(N). In some examples, the contract creator 12 may encrypt the plurality of envelopes 48(1)-48(N) using the public cryptographic key 40 ("e") prior to deploying the smart contract 26 (block 126). This operation may be omitted in examples in which the contract creator 12 is configured to communicate with the contract executor 16 via a secure transport protocol. The contract creator 12 then deploys the smart contract 26 comprising the plurality of envelopes 48(1)-48(N), the ciphertext 34, and the value R to the contract executor 16 (block 128). Some examples may provide that the operations of block 128 for deploying the smart contract 26 comprise deploying the smart contract 26 via a secure transport protocol (block 130). Operations in FIG. 3B then end.

Figure 4:
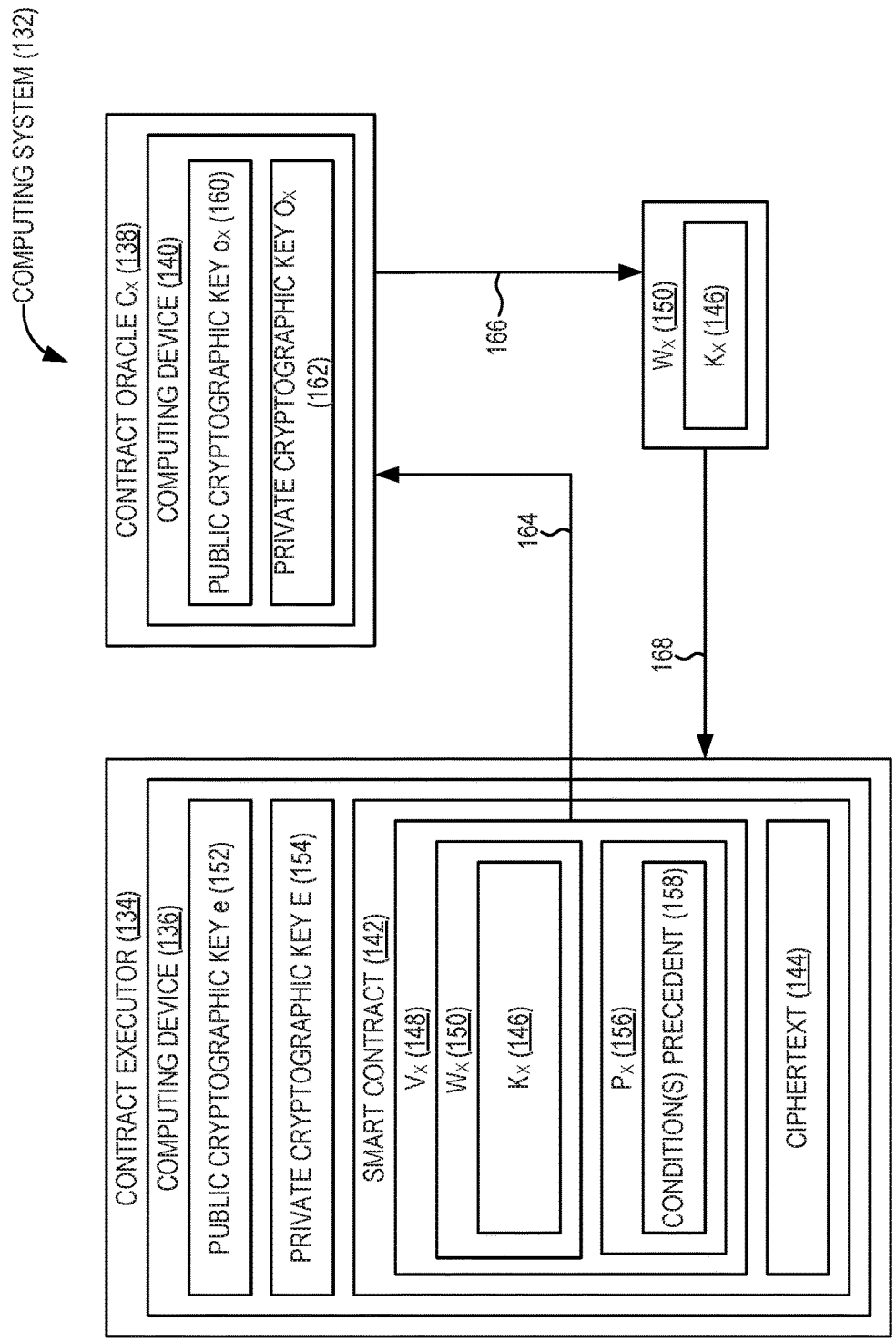
FIG. 4 is a simpler block diagram of the computing system of FIG. 1 for obtaining a symmetric cryptographic key $K_X$ of a contract creator by a contract executor, according to one example.

FIG. 4 is a simpler block diagram of a computing system 132, corresponding to the computing system 10 of FIG. 1, for illustrating interactions between a contract executor and a contract oracle, such as one of the contract oracles 20(1)-20(N) of FIG. 1, for obtaining a symmetric cryptographic key such as one of the symmetric cryptographic keys 32(1)-32(N) of FIG. 1. As noted above, the contract executor of FIG. 1 requires a subset of at least size R of the symmetric cryptographic keys 32(1)-32(N) to decrypt the ciphertext 34 of the smart contract 26. Accordingly, FIG. 4 shows how a contract executor and a contract oracle may interact in some examples to obtain one of the symmetric cryptographic keys within that subset.

Thus, in the example of FIG. 4, the computing system 132 includes a contract executor 134 comprising a computing device 136 and communicatively coupled to a contract oracle 138 ("$C_X$") comprising a computing device 140. The contract executor 134 stores a smart contract 142 that includes ciphertext 144 comprising sensitive data encrypted using a symmetric cryptographic key 146 ("$K_X$"). It is to be understood that the symmetric cryptographic key 146 is one of a plurality of symmetric cryptographic keys (not shown) within the smart contract 142, and further that the subscript X in the designation "$K_X$" for the symmetric cryptographic key 146 indicates that the symmetric cryptographic key 146 may be any one of a subset of at least size R of the plurality of symmetric cryptographic keys. It is to be further understood that each element illustrated in FIG. 4 with a subscript X (e.g., "$C_X$" and the like) represents an individual element within a plurality of similar elements, and corresponds to the symmetric cryptographic key 146.

As seen in FIG. 4, the smart contract 142 also includes an envelope 148 ("$V_X$") that stores a wrapper 150 ("$W_X$") in which the symmetric cryptographic key 146 itself is encrypted using a public cryptographic key 152 ("e") of the contract executor 134, where the public cryptographic key 152 corresponds to a private cryptographic key 154 ("E") of the contract executor 134. The envelope 148 additionally includes a policy 156 ("$P_X$") that comprises one or more conditions precedent 158 and that is digitally authenticated.

At a point in time after deployment of the smart contract 142 to the contract executor 134, the contract executor 134 determines whether the one or more conditions precedent 158 of the policy 156 of the smart contract 142 have been satisfied. If so, the contract executor 134 transmits the envelope 148 of the smart contract 142 to the contract oracle 138, as indicated by arrow 164.

Upon receiving the envelope 148, the contract oracle 138 confirms that the condition(s) precedent 158 of the policy 156 of the smart contract 142 have been satisfied. The contract oracle 138 then decrypts the wrapper 150 using the private cryptographic key 162, and then transmits the wrapper 150 back to the contract executor 134, as indicated by arrows 166 and 168. Note that, in some examples, the contract oracle 138 may opt to decrypt the wrapper 150 prior to evaluating the policy 156, rather than subsequent to evaluating the policy 156. The contract executor 134 then decrypts the symmetric cryptographic key 146 of the wrapper 150 using the private cryptographic key 154.

Figure 5:
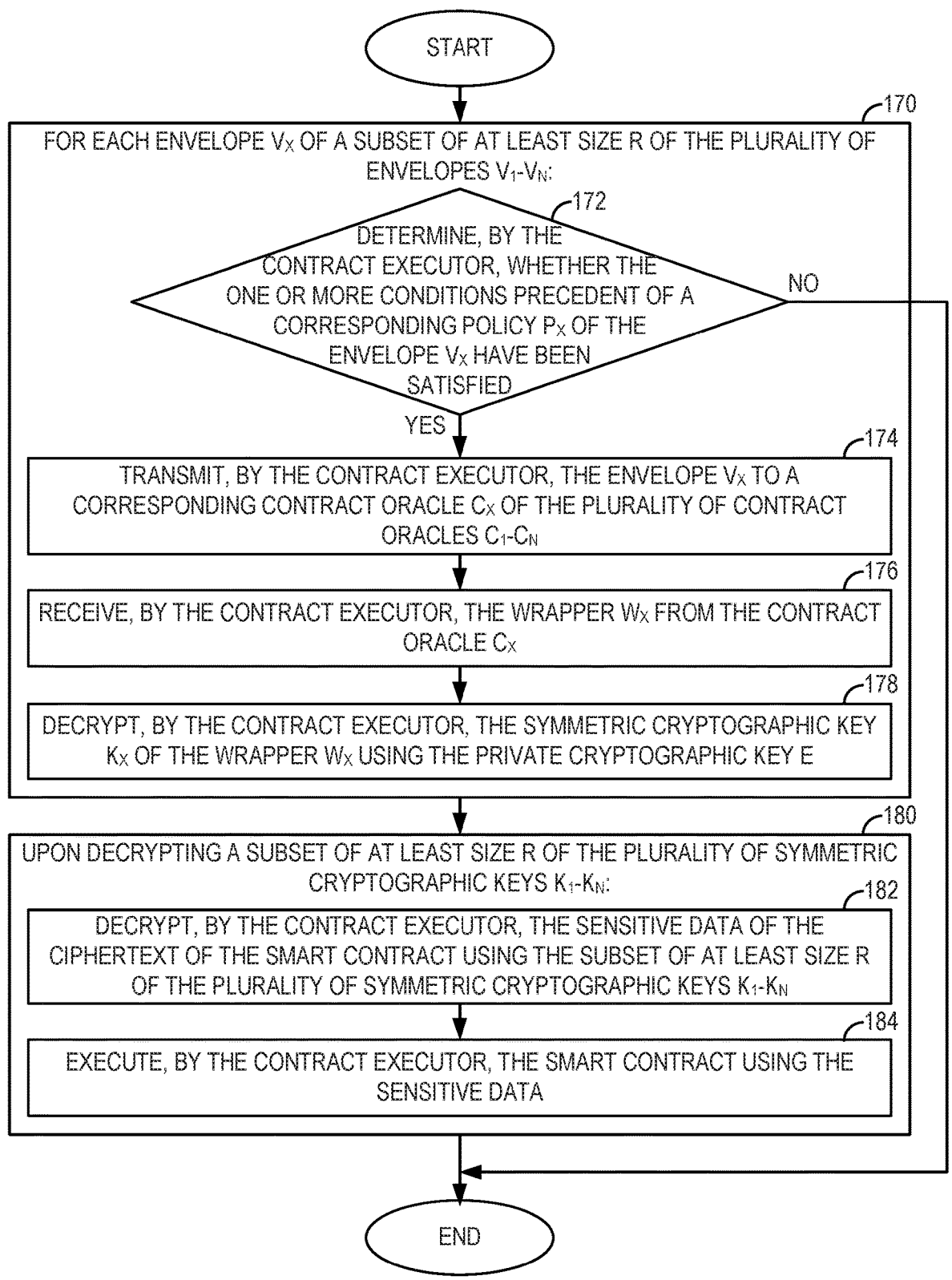
FIG. 5 is a flowchart of a method for obtaining a symmetric cryptographic key $K_X$ of a subset of at least size R of a plurality of symmetric cryptographic keys $K_1$-$K_N$ of a contract creator by a contract executor, and executing a smart contract by the contract executor, according to one example.

To illustrate operations for obtaining the symmetric cryptographic key 146 by the contract executor 134 and executing the smart contract 142 by the contract executor 134 according to one example, FIG. 5 is provided. Elements of FIGS. 1 and 4 are referenced in describing FIG. 5 for the sake of clarity. In FIG. 5, operations begin with the contract executor 134 performing a series of operations for each envelope 148 ("$V_X$") of a subset of at least size R of a plurality of envelopes such as the envelopes 48(1)-48(N) of FIG. 1 ("$V_1$-$V_N$") (block 170). The contract executor 134 determines whether the one or more conditions precedent 158 of the policy 156 ("$P_X$") of the envelope 148 have been satisfied (block 172). If not, operations in FIG. 5 end. However, if the contract executor 134 determines at decision block 172 that the one or more conditions precedent 158 of the policy 156 have been satisfied, the contract executor 134 transmits the envelope 148 to the corresponding contract oracle 138 ("$C_X$") of a plurality of contract oracles such as the contract oracles 20(1)-20(N) of FIG. 1 (block 174). The contract executor 134 subsequently receives the wrapper 150 ("$W_X$") from the contract oracle 138 (i.e., decrypted from the envelope 148 by the contract oracle 138) (block 176). The contract executor 134 next decrypts the symmetric cryptographic key 146 of the wrapper 150 using the private cryptographic key 154 ("E") (block 178).

The operations of block 170 of FIG. 5 may be performed one or more times until a subset of at least size R of a plurality of symmetric cryptographic keys $K_1$-$K_N$ (e.g., the symmetric cryptographic keys 32(1)-32(N)) have been decrypted by the contract executor 134 (block 180). At that point, the contract executor 134 decrypts the sensitive data of the ciphertext 144 of the smart contract 142 using the subset of at least size R of the plurality of symmetric cryptographic keys $K_1$-$K_N$ (block 182). The contract executor 134 then executes the smart contract 142 using the sensitive data (block 184). Operations in FIG. 5 then end.

Figure 6:
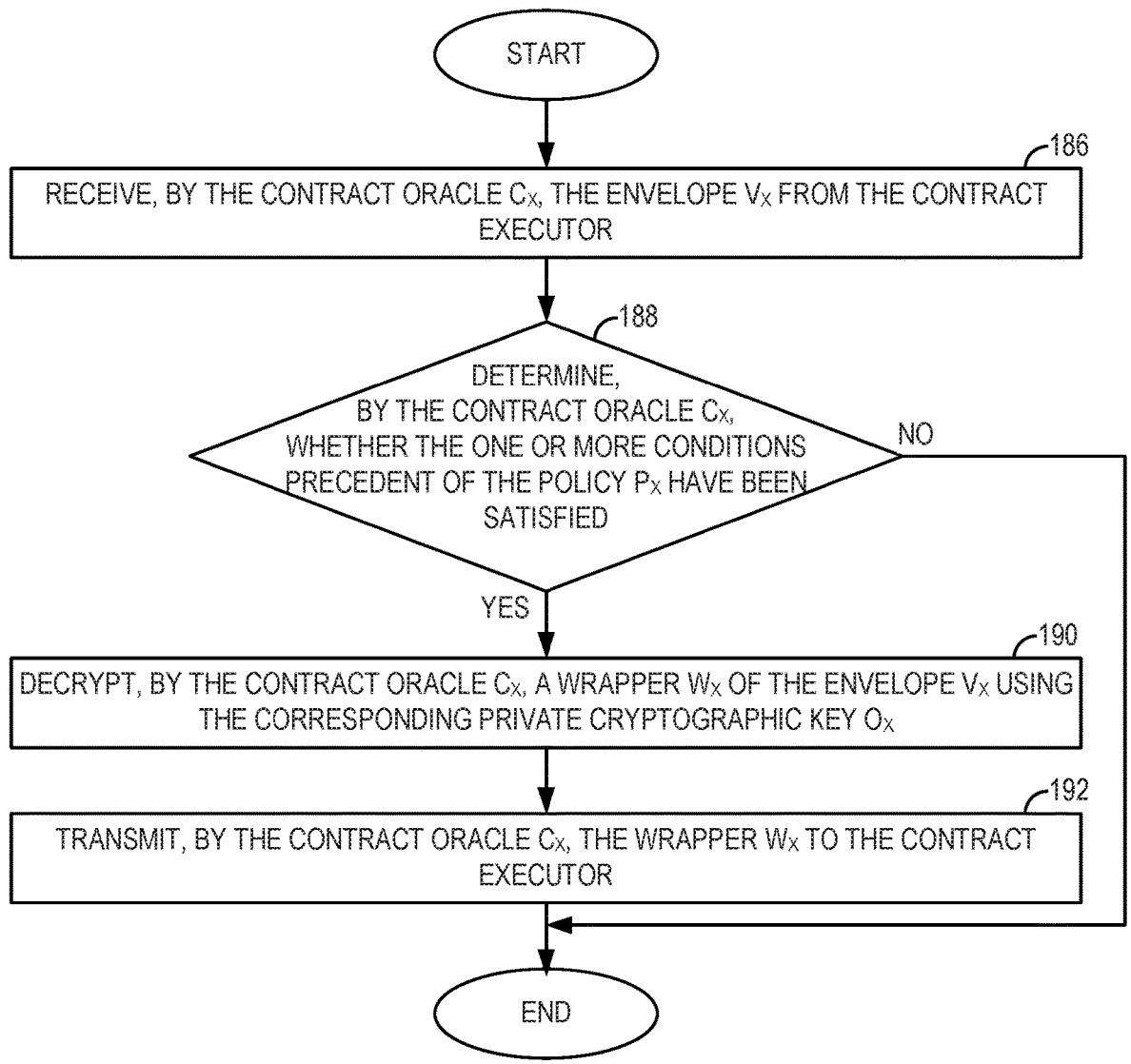
FIG. 6 is a flowchart of a method for decrypting and providing a wrapper $W_X$ containing an encrypted symmetric cryptographic key $K_X$ of a contract creator by a contract oracle $C_X$ of a plurality of contract oracles $C_1$-$C_N$, according to one example.

FIG. 6 illustrates a method for decrypting and providing the wrapper 150 containing the encrypted symmetric cryptographic key 146 by the contract oracle 138 of FIG. 4, according to one example. For the sake of clarity, elements of FIG. 4 are referenced in describing FIG. 6. Operations in FIG. 6 begin with the contract oracle 138 ("$C_X$") receiving the envelope 148 ("$V_X$") from the contract executor 134 (block 186). The contract oracle 138 determines whether the one or more conditions precedent 158 of the policy 156 ("$P_X$") have been satisfied (block 188). If not, operations in FIG. 6 end. However, if the contract oracle 138 determines at decision block 188 that the one or more conditions precedent 158 of the policy 156 have been satisfied, the contract oracle 138 decrypts the wrapper 150 ("$W_X$") of the envelope 148 using the private cryptographic key 162 ("$O_X$") (block 190). The contract oracle 138 then transmits the wrapper 150 to the contract executor 134 (block 192). Note that, in some examples, the operations of blocks 188 and 190 of FIG. 6 may be performed in reverse order. Thus, in such examples, the contract oracle 138 may perform the operations of block 188 for determining whether the one or more conditions precedent 158 of the policy 156 have been satisfied subsequent to performing the operations of block 190 for decrypting the wrapper 150 of the envelope 148 using the private cryptographic key 162.

Figure 7:
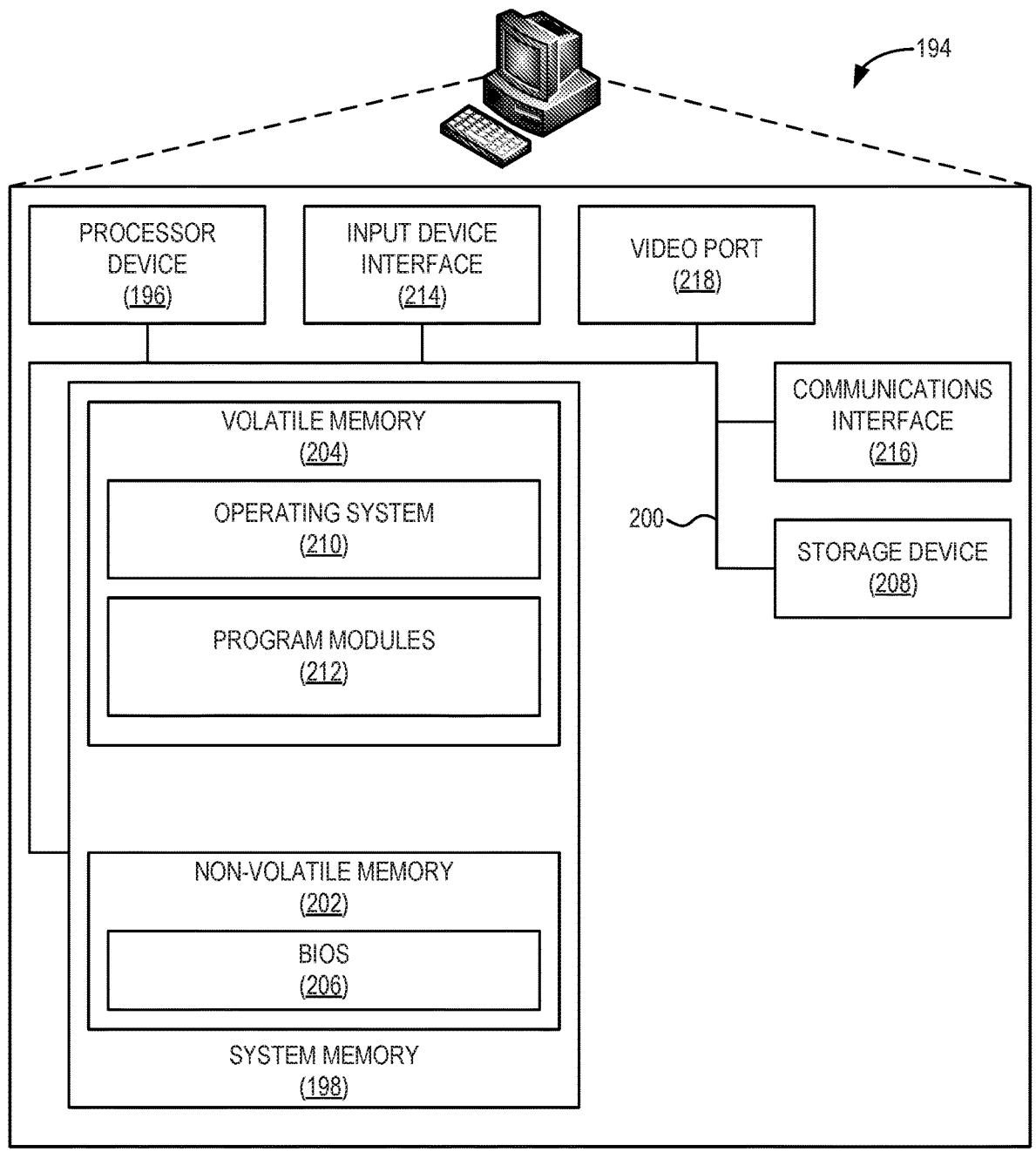
FIG. 7 is a block diagram of a computing device suitable for implementing examples, according to one example.

FIG. 7 is a block diagram of a processor-based computing device 194 ("computing device 194"), such as the computing device 14, the computing device 18, or the computing devices 22(1)-22(N) of FIG. 1, suitable for implementing examples according to one example. The computing device 194 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 194 includes a processor device 196, a system memory 198, and a system bus 200. The system bus 200 provides an interface for system components including, but not limited to, the system memory 198 and the processor device 196. The processor device 196 can be any commercially available or proprietary processor.

The system bus 200 may be any of several types of bus structures that may further interconnect to a memory bus (with or without a memory controller), a peripheral bus, and/or a local bus using any of a variety of commercially available bus architectures. The system memory 198 may include non-volatile memory 202 (e.g., read-only memory (ROM), erasable programmable ROM (EPROM), electrically EPROM (EEPROM), etc.), and volatile memory 204 (e.g., RAM). A basic input/output system (BIOS) 206 may be stored in the non-volatile memory 202 and can include the basic routines that help to transfer information among elements within the computing device 194. The volatile memory 204 may also include a high-speed RAM, such as static RAM, for caching data.

The computing device 194 may further include or be coupled to a non-transitory computer-readable storage medium such as a storage device 208, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 208 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 208 and in the volatile memory 204, including an operating system 210 and one or more program modules 212 which may implement the functionality described herein in whole or in part. It is to be appreciated that the examples can be implemented with various commercially available operating systems 210 or combinations of operating systems 210. All or a portion of the examples may be implemented as a computer program product stored on a transitory or non-transitory computer-usable or computer-readable storage medium, such as the storage device 208, which includes complex programming instructions, such as complex computer-readable program code, to cause the processor device 196 to carry out the steps described herein. Thus, the computer-readable program code can comprise software instructions for implementing the functionality of the examples described herein when executed on the processor device 196. The processor device 196 may serve as a controller, or control system, for the computing device 194 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 196 through an input device interface 214 that is coupled to the system bus 200 but can be connected by other interfaces, such as a parallel port, an Institute of Electrical and Electronic Engineers (IEEE) 1394 serial port, a Universal Serial Bus (USB) port, an IR interface, and the like.

The computing device 194 may also include a communications interface 216 suitable for communicating with a network as appropriate or desired. The computing device 194 may also include a video port 218 to interface with a display device to provide information to a user.

Individuals will recognize improvements and modifications to the preferred examples of the disclosure. All such improvements and modifications are considered within the scope of the concepts disclosed herein and the claims that follow.

The examples also facilitate an improvement to computer functionality itself via the enabling of sensitive data to be incorporated directly into smart contracts in encrypted form using encryption keys provided by contract oracles, and further to be decrypted by a contract executor using decryption keys provided by contract oracles. Thus, the examples are directed to specific improvements in computer functionality.

What is claimed is:

1. A computing system, comprising a contract creator comprising a first computing device comprising a first memory and a first processor device coupled to the first memory, the contract creator to:
   generate a plurality of symmetric cryptographic keys K1-KN, where $N>1$;
   encrypt sensitive data for a smart contract into ciphertext using the plurality of symmetric cryptographic keys K1-KN, based on a threshold cryptosystem requiring a subset of at least size R of the plurality of symmetric cryptographic keys K1-KN to decrypt the ciphertext, where $1 \leq R \leq N$;
   encrypt the plurality of symmetric cryptographic keys K1-KN into a corresponding plurality of wrappers W1-WN using a public cryptographic key e of a contract executor, the public cryptographic key e corresponding to a private cryptographic key E of the contract executor;
   generate a plurality of envelopes V1-VN using a corresponding plurality of public cryptographic keys o1-oN of a corresponding plurality of contract oracles C1-CN, wherein:
      the plurality of public cryptographic keys o1-oN correspond to a plurality of private cryptographic keys O1-ON of the plurality of contract oracles C1-CN; and
      the plurality of envelopes V1-VN comprises:
         the corresponding plurality of wrappers W1-WN further encrypted using the corresponding plurality of public cryptographic keys o1-oN; and
         a corresponding plurality of policies P1-PN, each digitally authenticated and comprising one or more conditions precedent; and
   deploy, to the contract executor, the smart contract comprising the plurality of envelopes V1-VN, the ciphertext, and R.

2. The computing system of claim 1, wherein the threshold cryptosystem comprises Shamir's Secret Sharing cryptosystem.

3. The computing system of claim 1, wherein the contract creator is further to, prior to encrypting the sensitive data for the smart contract and encrypting the plurality of symmetric cryptographic keys K1-KN:
   receive, from the contract executor, the public cryptographic key e; and
   receive, from the plurality of contract oracles C1-CN, the corresponding plurality of public cryptographic keys o1-oN.

4. The computing system of claim 1, wherein the contract creator is further to, prior to deploying the smart contract, encrypt the plurality of envelopes V1-VN using the public cryptographic key e.

5. The computing system of claim 1, wherein the contract creator is to deploy the smart contract to the contract executor via a secure transport protocol.

6. The computing system of claim 1, wherein the contract executor comprises a node of a plurality of nodes of a distributed ledger network.

7. The computing system of claim 1, further comprising the contract executor, comprising a second computing device comprising a second memory and a second processor device coupled to the second memory, and communicatively coupled to the contract creator;
   the contract executor to, for each envelope VX of a subset of at least size R of the plurality of envelopes V1-VN:
      determine whether the one or more conditions precedent of a corresponding policy PX of the envelope VX have been satisfied; and
      responsive to determining that the one or more conditions precedent of the policy PX have been satisfied, transmit the envelope VX to a corresponding contract oracle CX of the plurality of contract oracles C1-CN.

8. The computing system of claim 7, further comprising the plurality of contract oracles C1-CN, each comprising a corresponding computing device comprising a corresponding memory and a corresponding processor device coupled to the corresponding memory, and communicatively coupled to the contract creator and the contract executor;
   each contract oracle CX of the plurality of contract oracles C1-CN corresponding to the envelope VX to:
      decrypt a wrapper WX of the envelope VX using a corresponding private cryptographic key OX; and
      transmit the wrapper WX to the contract executor.

9. The computing system of claim 8, wherein:
   each contract oracle CX of the plurality of contract oracles C1-CN corresponding to the envelope VX is further to determine whether the one or more conditions precedent of the policy PX have been satisfied; and
   to decrypt the wrapper WX of the envelope VX using the corresponding private cryptographic key OX is to decrypt the wrapper WX responsive to determining that the one or more conditions precedent of the policy PX have been satisfied.

10. The computing system of claim 8, the contract executor further to:
    decrypt a symmetric cryptographic key KX of the wrapper WX using the private cryptographic key E; and upon decrypting the subset of at least size R of the plurality of symmetric cryptographic keys K1-KN:
   decrypt the sensitive data of the ciphertext of the smart contract using the subset of at least size R of the plurality of symmetric cryptographic keys K1-KN; and
   execute the smart contract using the sensitive data.

11. A method, comprising:
generating, by a contract creator comprising a first computing device, a plurality of symmetric cryptographic keys K1-KN, where N>1;
encrypting, by the contract creator, sensitive data for a smart contract into ciphertext using the plurality of symmetric cryptographic keys K1-KN, based on a threshold cryptosystem requiring a subset of at least size R of the plurality of symmetric cryptographic keys K1-KN to decrypt the ciphertext, where $1 \leq R \leq N$;
encrypting, by the contract creator, the plurality of symmetric cryptographic keys K1-KN into a corresponding plurality of wrappers W1-WN using a public cryptographic key e of a contract executor comprising a second computing device, the public cryptographic key e corresponding to a private cryptographic key E of the contract executor;
generating, by the contract creator, a plurality of envelopes V1-VN using a corresponding plurality of public cryptographic keys o1-oN of a corresponding plurality of contract oracles C1-CN, each comprising a computing device, wherein:
   the plurality of public cryptographic keys o1-oN correspond to a plurality of private cryptographic keys O1-ON of the plurality of contract oracles C1-CN; and
   the plurality of envelopes V1-VN comprises:
      a corresponding plurality of wrappers W1-WN further encrypted using the corresponding plurality of public cryptographic keys o1-oN; and
      a corresponding plurality of policies P1-PN, each digitally authenticated and comprising one or more conditions precedent; and
deploying, by the contract creator to the contract executor, the smart contract comprising the plurality of envelopes V1-VN, the ciphertext, and R.

12. The method of claim 11, wherein the threshold cryptosystem comprises Shamir's Secret Sharing cryptosystem.

13. The method of claim 11, further comprising, prior to encrypting the sensitive data for the smart contract and encrypting the plurality of symmetric cryptographic keys K1-KN:
   receiving, by the contract creator from the contract executor, the public cryptographic key e; and
   receiving, by the contract creator from the plurality of contract oracles C1-CN, the corresponding plurality of public cryptographic keys o1-oN.

14. The method of claim 11, further comprising, prior to deploying the smart contract, encrypting, by the contract creator, the plurality of envelopes V1-VN using the public cryptographic key e.

15. The method of claim 11, wherein deploying the smart contract to the contract executor comprises deploying the smart contract to the contract executor via a secure transport protocol.

16. The method of claim 11, wherein the contract executor comprises a node of a plurality of nodes of a distributed ledger network.

17. The method of claim 11, further comprising, for each envelope VX of a subset of at least size R of the plurality of envelopes V1-VN:
   determining, by the contract executor, whether the one or more conditions precedent of a corresponding policy PX of the envelope VX have been satisfied; and
   responsive to determining that the one or more conditions precedent of the policy PX have been satisfied, transmitting, by the contract executor, the envelope VX to a corresponding contract oracle CX of the plurality of contract oracles C1-CN.

18. The method of claim 17, further comprising:
   decrypting, by the contract oracle CX, a wrapper WX of the envelope VX using a corresponding private cryptographic key OX; and
   transmitting, by the contract oracle CX, the wrapper WX to the contract executor.

19. The method of claim 18, wherein:
   the method further comprises determining, by the contract oracle CX corresponding to the envelope VX, whether the one or more conditions precedent of the policy PX have been satisfied; and
   decrypting the wrapper WX of the envelope VX using the corresponding private cryptographic key OX is responsive to determining that the one or more conditions precedent of the policy PX have been satisfied.

20. The method of claim 18, further comprising:
   decrypting, by the contract executor, a symmetric cryptographic key KX of the wrapper WX using the private cryptographic key E; and
   upon decrypting the subset of at least size R of the plurality of symmetric cryptographic keys K1-KN:
      decrypting, by the contract executor, the sensitive data of the ciphertext of the smart contract using the subset of at least size R of the plurality of symmetric cryptographic keys K1-KN; and
      executing, by the contract executor, the smart contract using the sensitive data.

* * * * *